United States Patent [19]

Warman

[11] Patent Number: 5,132,588

[45] Date of Patent: Jul. 21, 1992

[54] VIEWING SCREEN PROTECTIVE SHIELD

[76] Inventor: William J. Warman, 210 N. 86th St., Mesa, Ariz. 85207

[21] Appl. No.: 309,486

[22] Filed: Feb. 13, 1989

[51] Int. Cl.$^5$ .............................................. H04N 5/72
[52] U.S. Cl. .................................. 313/479; 313/478; 358/245; 358/253
[58] Field of Search ................... 313/461, 477 R, 478, 313/479; 358/245, 247, 253; 150/154, 165, 168; 206/633

[56] References Cited

U.S. PATENT DOCUMENTS

| | | | |
|---|---|---|---|
| 2,958,801 | 11/1960 | Herriott | 313/478 |
| 3,964,780 | 6/1976 | Naidu | 150/168 |
| 3,995,674 | 12/1976 | Crawford | 150/52 |
| 4,204,231 | 5/1980 | Permenter | 358/247 |
| 4,259,568 | 3/1981 | Dynesen | 235/10 |
| 4,652,085 | 3/1987 | Selling et al. | 358/253 |
| 4,726,406 | 2/1988 | Weatherspoon | 150/52 K |
| 4,733,776 | 3/1988 | Ward | 206/305 |
| 4,746,043 | 5/1988 | Booker | 224/219 |

Primary Examiner—Donald J. Yusko
Assistant Examiner—Michael Horabik
Attorney, Agent, or Firm—Leon Gilden

[57] ABSTRACT

A viewing screen protective shield is set forth removably securable in association with a viewing screen, such as LCR screens, as found in fish finders and the like, which are typically exposed to adverse weather conditions. The protective shield is readily removable and replaceable and include convex peripheral edges to conform the shield to the convex screen with an outwardly extending tab formed outwardly of a single corner of the shield to enhance manual grasping thereof. To enhance securement of the shield to the associated screen, a plurality of transparent adhesive strips may be secured to an interior surface of the shield to enhance securement of the transparent shield to the associated screen.

1 Claim, 1 Drawing Sheet

U.S. Patent     July 21, 1992     5,132,588
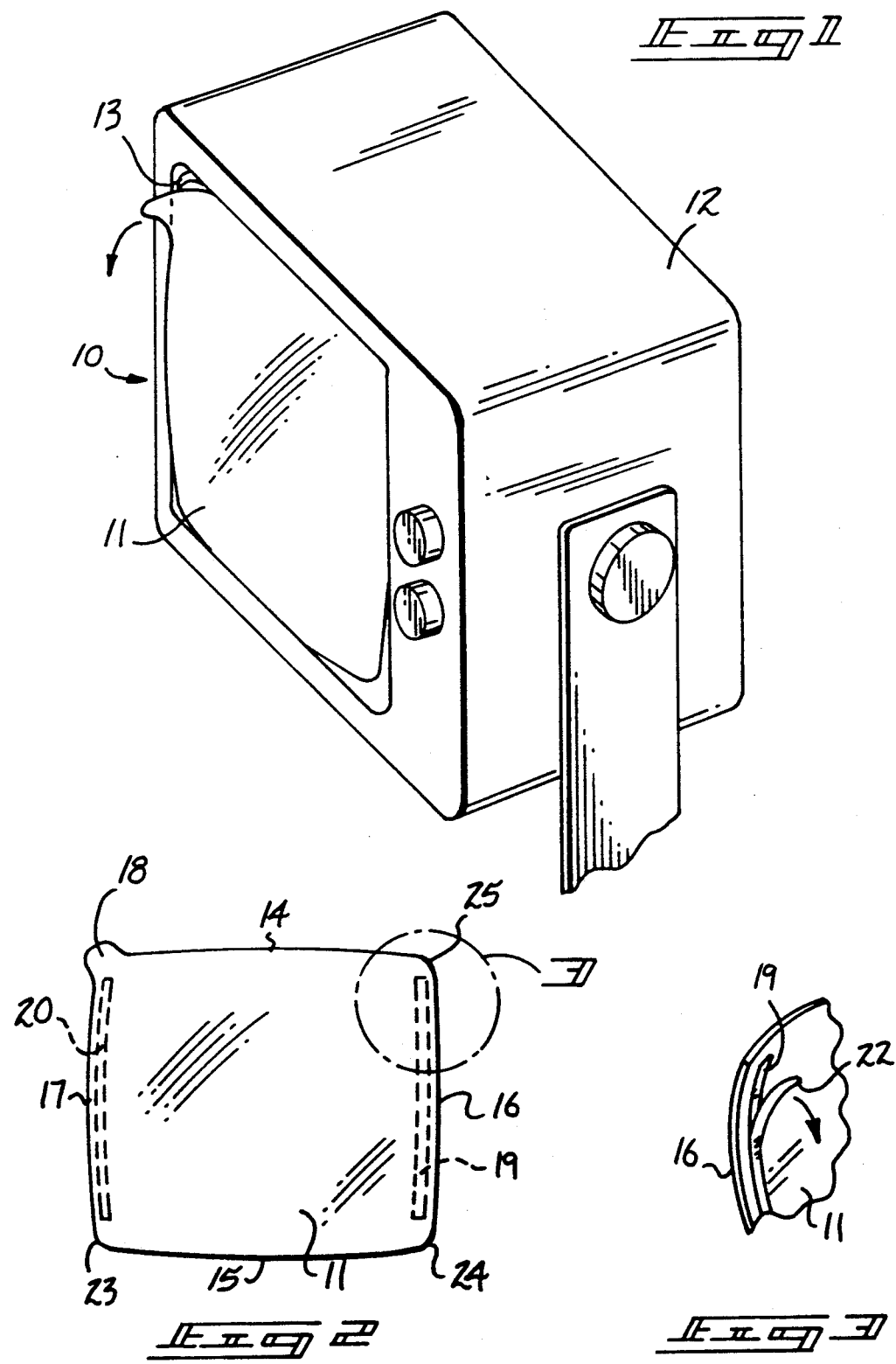

VIEWING SCREEN PROTECTIVE SHIELD

BACKGROUND OF THE INVENTION

1. Field of the Invention

The field of invention relates to protective shields, and more particularly pertains to a new and improved viewing screen protective shield wherein the same may be readily secured and replaced as necessary in association with a viewing screen typically exposed to erosion.

2. Description of the Prior Art

The use of protective shields of various types to afford a level of protection to an associated device is known in the prior art. Shields of the prior art have typically been of cumbersome and expansive construction or of configurations not particularly well suited for providing replacement shields to viewing screens exposed to erosion in their environment such as fish finders and the like, and subject to solar, airborne dust particles, and water spray exposure. Examples of prior art protective shields available may be found in U.S. Pat. No. 3,995,674 to Crawford for example. The Crawford patent utilizes an angulated shield securable to an upper surface of a television receiver to deflect articles falling thereon. The angulation of the upper shield prevents objects from entering the electrical circuitry and air ducts rearwardly of the television set.

U.S. Pat. No. 4,259,568 to Dynesen sets forth a casing pivotally mounted rearwardly of a calculator that may optionally support or protect the calculator face. The Dynesen patent is of relatively rigid construction to address the problem of protecting a calculator during storage thereof.

U.S. Pat. No. 4,726,406 to Weatherspoon sets forth a flexible vinyl protective covering for securement overlying a vehicular windshield including a plurality of fasteners for securement of the shield to the automobile as well as utilizing stiffening elements along peripheral side edges of the shield to maintain the geometric integrity of the shield during use.

U.S. Pat. No. 4,733,776 to Ward sets forth a transparent shield utilizing hook and loop fasteners for securement of the shield and an associated foam protective layer to cover the elongate surfaces of various electrical devices to enable utilization of the device while simultaneously protecting the device subject to breakage during use.

U.S. Pat. No. 4,746,043 to Booker sets forth an enclosure for calculator type devices utilizing an enclosure with a transparent window positioned therethrough to enable access to the various components of the calculator or the like while simultaneously protecting the calculator from impact during use.

As such, it may be appreciated that there is a continuing need for a new and improved viewing screen protective shield wherein the same addresses both the problems of effectiveness in use and ease of installation or removal, and in this respect, the present invention substantially fulfills this need.

SUMMARY OF THE INVENTION

In view of the foregoing disadvantages inherent in the known types of protective shields now present in the prior art, the present invention provides a viewing screen protective shield wherein the same may be readily and efficiently securable to a viewing screen typically subject to destructive environmental conditions. As such, the general purpose of the present invention, which will be described subsequently in greater detail, is to provide a new and improved viewing screen protective shieled which has all the advantages of the prior art protective shields and none of the disadvantages.

To attain this, the present invention comprises a relatively thin polymeric flexible shield adherably mountable to a viewing screen. The shield is of generally rectangular configuration formed with convexly outwardly extending peripheral edges with a single extending tab directed outwardly of a corner of the intersection of two of the edges to enable and enhance manual grasping of the shield. The shield may be polarized to reduce glare in daylight viewing conditions and be further provided with a plurality of transparent adhesive strips for enhanced securement of the shield to a viewing screen.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved viewing screen protective shield which has all the advantages of the prior art protective shields and none of the disadvantages.

It is another object of the present invention to provide a new and improved viewing screen protective shields which may be easily and efficiently manufactured and marketed.

It is a further object of the present invention to provide a new and improved viewing screen protective shield which is of a durable and reliable construction.

An even further object of the present invention is to provide a new and improved viewing screen protective shield which is susceptible of a low cost of manufacture with regard to both materials and labor, and which accordingly is then susceptible of low prices of sale to the consuming public, thereby making such viewing screen protective shields economically available to the buying public.

Still yet another object of the present invention is to provide a new and improved viewing screen protective shield which provides in the apparatuses and methods of the prior art some of the advantages thereof, while simultaneously overcoming some of the disadvantages normally associated therewith.

Still another object of the present invention is to provide a new and improved viewing screen protective shield wherein the same is readily securable and releasable in association with a viewing screen.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in association with an electronic device including a viewing screen.

FIG. 2 is an orthographic top plan view of the instant invention.

FIG. 3 is an isometric illustration of Section 3, as illustrated in FIG. 2.

DESCRIPTION OF THE PREFERRED EMBODIMENT

With reference now to the drawings, and in particular to FIGS. 1 to 3 thereof, a new and improved viewing screen protective shield embodying the principles and concepts of the present invention and generally designated by the reference numeral 10 will be described.

More specifically, it will be noted that the viewing screen protective shield 10 essentially comprises a polymeric transparent film 11 adherably securable to the viewing screen 13 of an electronic instrument 12, such as a fish finder and the like. Instruments of this class are typically exposed to adverse environmental conditions such as airborne debris, dust, water vapor, and solar exposure. The viewing screen 13 is formed with arcuate corners conventional in the industry and is of a generally convex outwardly extending geometric configuration. The film 11 may be formed to be polarized to reduce glare during usage of the device 12 and film 11 in outdoor environments.

The film 11 is formed with convex peripheral edges including top edge 14, bottom edge 15, right edge 16, and left edge 17, whereupon application of the film to the viewing screen 12, the film 11 will overlie the entire surface of the screen. A tab 18 extends diagonally outwardly of the intersection of the left and top edges 17 and 14 respectively to enhance manual grasping of the film to enable an individual to readily remove and replace the film 11 as it, rather than the more expensive screen 12, loses clarity due to exposure in particular environmental scenarios.

The intersection of the top and right edges 14 and 16, right and bottom 16 and 15, and bottom and left edges 15 and 17, are formed as arcuate corners to conform the film 11 to the viewing screen 13.

Further, natural adhesion between the polymeric film 11 and the polymeric viewing screen 13 enables adhesion of the film to the screen. Additional transparent adhesive strips 19 and 20 positioned adjacent right and left edges 16 and 17 respectively enables enhanced securement of the film 11 to the screen 13 wherein each adhesive strip is provided with a removable covering strip 22 that may be peeled away to expose the adhesive thereunder and enable the securement of the film to the screen 13. Further, it should be noted that the film 11 is of a constant thickness throughout to avoid distortion in the viewing of subject matter presented by the electronic device 12 through the viewing screen 13.

As to the manner of usage and operation of the instant invention, the same should be apparent from the above description, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A viewing screen protective shield for use in combination with an electronic device having a convex viewing screen formed with arcuate corners, said shield comprising, a thin transparent film of constant thickness defined by a forward face and a rear face, and said film defined by a generally rectangular configuration with convex outwardly extending peripheral edges, and said edges defined by a top, bottom, right, and left edge, and a tab extending outwardly of a junction defined by said top and left edges, and wherein the junctions defined by the intersection of the top and right edges, right and bottom edges, bottom and left edges, are of arcuate geometric configuration to conform to the arcuate corners of the viewing screen, and wherein the film is polarized to minimize glare when utilized in an environment exposed to sunlight, and wherein a first and second clear transparent adhesive strip is secured to the rear face of the film adjacent the right and left edges of the film, and wherein the adhesive strips include an overlying removable covering strip manually removable to expose adhesive thereunder for enhanced securement to the viewing screen.

* * * * *